United States Patent [19]
Salamon et al.

[11] Patent Number: 4,751,032
[45] Date of Patent: Jun. 14, 1988

[54] PROCESS AND APPARATUS FOR THE MANUFACTURE OF REFRIGERATING CABINETS

[75] Inventors: Aldo Salamon, Pordenone; Ireneo DeNardi, Treviso; Francesco Pagura, Pordenone, all of Italy

[73] Assignee: Industrie Zanussi, S.p.A., Pordenone, Italy

[21] Appl. No.: 27,820

[22] Filed: Mar. 19, 1987

[30] Foreign Application Priority Data

Mar. 19, 1986 [IT] Italy .............................. 45710 A/86

[51] Int. Cl.[4] ...................... B29C 65/00; B29C 27/60; B22D 19/08; B28B 1/50

[52] U.S. Cl. ................................ 264/46.5; 29/455 R; 29/460; 264/261; 249/88; 269/48.1; 428/817 R; 428/DIG. 29

[58] Field of Search ............. 29/428, 460, 434, 455 R; 269/48.1; 312/257 SM, 214; 425/817 R, DIG. 29, 117; 264/46.5, 46.7, 261, 262; 249/88, 91, 93

[56] References Cited

U.S. PATENT DOCUMENTS

| | | | |
|---|---|---|---|
| RE. 27,593 | 3/1973 | Gondeck et al. | 264/46.5 X |
| 1,938,437 | 12/1933 | O'Brien | 269/48.1 |
| 3,091,946 | 6/1963 | Kesling | 264/46.6 X |
| 3,137,744 | 6/1964 | Burrus | 264/46.5 |
| 3,155,751 | 11/1964 | Morris | 425/817 R X |
| 3,163,686 | 12/1964 | Dusel et al. | 425/817 R X |
| 3,177,271 | 4/1965 | Slayman | 264/46.5 |
| 3,403,486 | 10/1968 | Schubeis | 269/48.1 UX |
| 3,880,415 | 4/1975 | Fujioka et al. | 425/817 R X |
| 4,082,825 | 4/1978 | Puterbaugh | 264/46.5 |

FOREIGN PATENT DOCUMENTS

| | | | |
|---|---|---|---|
| 1139196 | 1/1969 | United Kingdom | 264/46.5 |

OTHER PUBLICATIONS

"Modern Plastics", publication dated Oct. 1963, vol. 41, No. 2, pp. 162–165, 310.

*Primary Examiner*—Charlie T. Moon
*Attorney, Agent, or Firm*—Wenderoth, Lind & Ponack

[57] ABSTRACT

Refrigerating cabinets of different sizes and shapes may be manufactured by the use of a single positioning member. Thus, the positioning member has a configuration which is adjustable to adapt to the particular shape of a given inner housing of refrigerating cabinet. When the adjustment is made, the performed housing is fixedly positioned on the thus adjusted positioning member. Previously formed outer walls of the particular cabinet involved then are positioned about the thus positioned housing, with a space being defined between the housing and the outer walls. The positioning member further includes elements which may be employed to partially form a foaming jig. This total unit then is moved to a simplified foaming unit, whereafter the formation of the foaming jig is completed, and insulation material is foamed into the space between the housing and the outer walls.

10 Claims, 4 Drawing Sheets

13
32
25
26
26
23
24
27
28
28
22
40
27
40
30
21
27
42
20
14
31
26
41
33
26
44

35
18
12
42
34
16
30
14
31

PROCESS AND APPARATUS FOR THE MANUFACTURE OF REFRIGERATING CABINETS

BACKGROUND OF THE INVENTION

The present invention relates to a process and apparatus for use in the manufacture of refrigerating cabinets of the type including an inner housing of thermoformed plastic material, outer walls spaced from the housing, and foamed insulation material filling the space between the housing and the outer walls.

This general type of refrigerating cabinet is known, and the fabrication of such cabinets requires a series of production operations summarized generally as follows. Thus, a panel of suitable plastic material is thermoformed to obtain an appropriately shaped inner housing. This inner housing is fixedly positioned on a positioning support member, and the outer walls of the cabinet are mounted about the thus positioned cabinet, while defining a space between the housing and the outer walls. The assembly thus formed is preheated, and insulating material is foamed into the space between the housing and the outer walls by injection, while employing an enclosure assembly commonly referred to as a foaming jig.

The general practice is that the various elements assembled in the different manufacturing steps are moved by conveyers or rollers to the required assembly locations, and the handling operations throughout the entire manufacturing cycle require a complex coordination and control system.

This basic manufacturing cycle includes a number of inherent disadvantages, in particular due to the fact that different types and shapes of cabinets require substantially entirely different and separate assembly installations. Particularly, different types and sizes of cabinets require respective separate positioning members and separate corresponding foaming jigs. As a result, the assembling and foaming operations for each type and shape of cabinet are entirely independent, and this requires substantial space and capital investment. Also, the handling and conveying systems employed in each separate installation are fixed, thus further accentuating this basic problem of lack of adjustability.

SUMMARY OF THE INVENTION

Accordingly, it is an object of the present invention to provide a process and apparatus of the above general type but which are flexible and may be adjusted to enable the manufacture of different cabinets of different shapes and sizes.

It is a further object of the present invention to provide such a process and apparatus whereby it is possible to basically employ a universal apparatus that is adjustable and can be adapted to the manufacture of different types and shapes of cabinets, thereby enabling the assembly, handling and foaming operations to be simplified and more automated.

It is a yet further object of the present invention to provide such a process and apparatus whereby the conveying systems necessary are substantially reduced and simplified.

It is an even further object of the present invention to provide such a process and apparatus whereby the amount of equipment necessitated is reduced substantially, thereby reducing the space required and the amount of capital investment necessary.

These and other objects are achieved in according with the present invention by the provision of a process and apparatus whereby it is possible to employ a single positioning member for supporting different preformed housings of a plurality of different types and shapes. This is achieved by the provision of a single positioning member with means for adjusting the configuration thereof to adapt to the plurality of different shapes. Prior to supporting a given housing of one shape on the positioning member, the positioning member is adjusted to the particular configuration of the shape of the housing.

In accordance with a particular feature of the present invention, the positioning member includes a support base, and a plurality of modular members are mounted on the support base. At least some of the modular members are mounted for adjustable movement along the support base to given positions. Lining panels having dimensions to define the configuration of the positioning member adapted to a particular housing shape then are fitted on the thus positioned modular members. In other words, in accordance with the present invention, a single positioning member including a support base and modular elements movable therealong is provided. A plurality of sets of lining panels adapted to particular housing shapes also are provided, and the lining panels of a given set of lining panels are fitted onto the modular members when in respective relative positions thereof to thereby define the positioning member configuration adapted to a particular type and shape of preformed cabinet housing.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Figure 1:
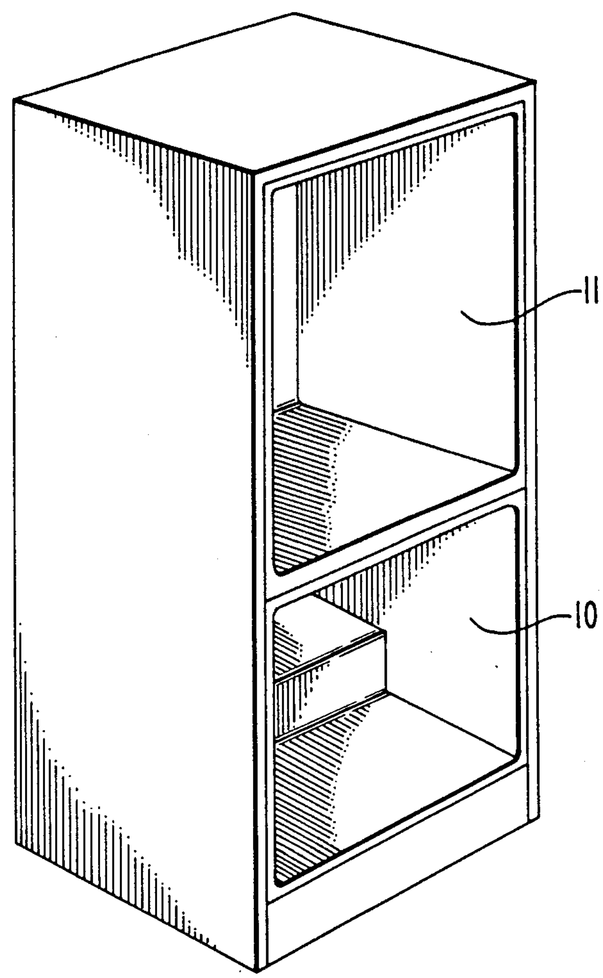
FIG. 1 is a perspective view of a refrigerating cabinet produced in accordance with the process and apparatus of the present invention.

FIG. 1 illustrates one embodiment of a refrigerating cabinet which may be produced according to the process and apparatus of the present invention. The configuration of the cabinet is itself intended to be conventional, and furthermore the process and apparatus of the present invention are not intended to be limited to the formation of this specifically configurated cabinet. Indeed, the fundamental concept of the present invention involves the use of a single apparatus which may be adjusted to enable the use thereof for the formation of cabinets of a variety of different shapes and sizes. The cabinet shown in FIG. 1 includes two superposed compartments, namely an upper compartment 10 intended for the storage of fresh food stuffs at a given temperature, for example a temperature of +5° C., and a lower compartment 11 for the storage of frozen articles at a given temperature, for example of −18° C.

This cabinet includes, in a conventional manner, an inner housing thermally formed from a panel of plastic material, for example polystyrene, and outer walls normally formed of particularly profiled and shaped metallic sheets. An inner space defined between the housing and outer walls is filled with heat insulating material, normally polyurethane foam.

The invention particularly is directed to improvements in the operations of assembling the elements that form the cabinet and the operation of foaming of the insulating material. The fundamental concept of the present invention involves the provision of a single apparatus which may be employed by selective adjustment for the assembly and foaming of cabinets of a plurality of different types and shapes.

Figure 2:
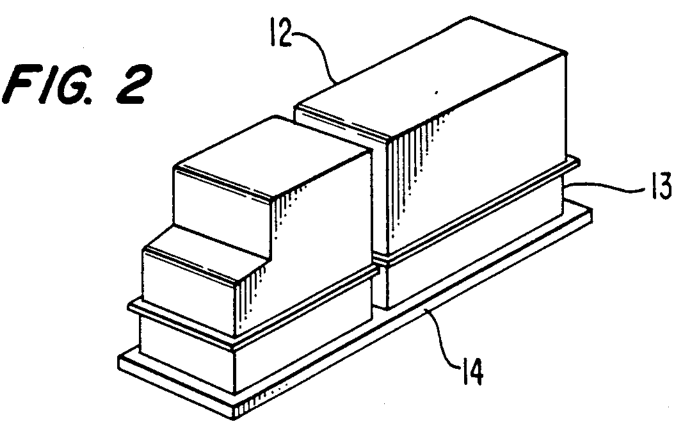
FIGS. 2 through 4 are perspective views illustrating the general sequence of operations in manufacturing a cabinet such as shown in FIG. 1.
Figure 3:
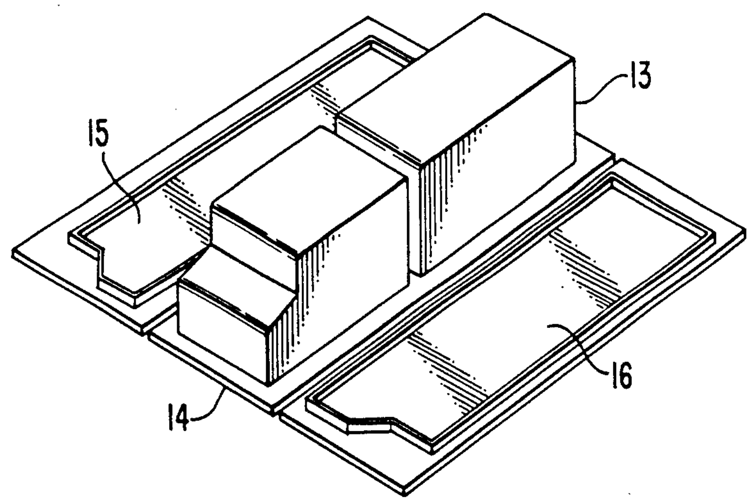
Figure 4:
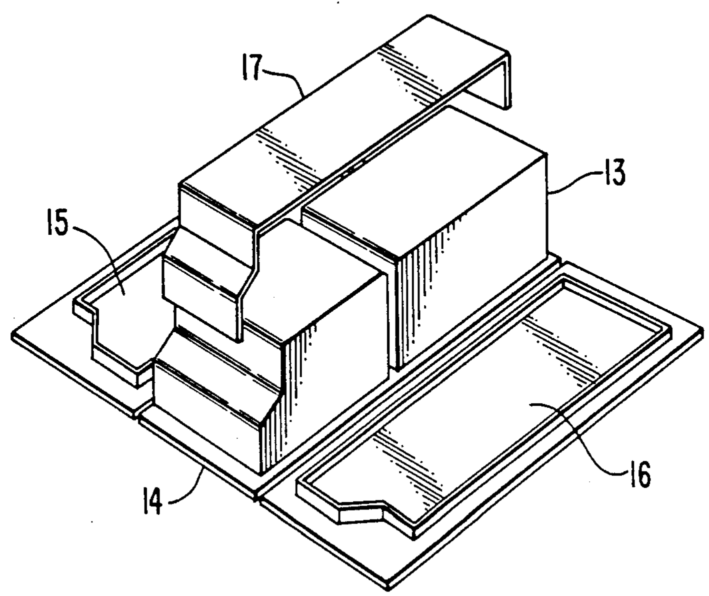

Thus, with reference to FIGS. 2–4, there is provided a support base 14 having mounted thereon a novel positioning member 13 according to the present invention. An inner housing 12 is formed by known thermoforming techniques in a previous operation which forms no part of the present invention. Housing 12 is fitted over positioning member 13 so that the position of housing 12 is fixed. Thereafter, various outer walls 15, 16, 17 are positioned about the thus supported housing 12 to define a space therebetween. The thus formed assembly then is introduced into a foaming jig whereat insulation material is foamed into the space, thereby completing the cabinet. These fundamental operations in and of themselves are known.

However, in the past it has been necessary to provide a separate positioning member 13 having a configuration adapted to a particular housing shape, such that when cabinets of a number of different shapes and types are to be formed it has been necessary to provide a plurality of different positioning members. It also has been necessary to provide a number of different foaming jigs.

The manifest disadvantages of such an arrangement are overcome however in accordance with the present invention.

Thus, in accordance with the present invention there is provided a single positioning member 13 which is adjustable to a plurality of different configurations, whereby it is possible to employ the single positioning member to fixedly position housings of a plurality of different shapes, whereby it is possible to employ the single positioning member for the formation of a plurality of different types and shapes of refrigerating cabinets.

Figure 5:
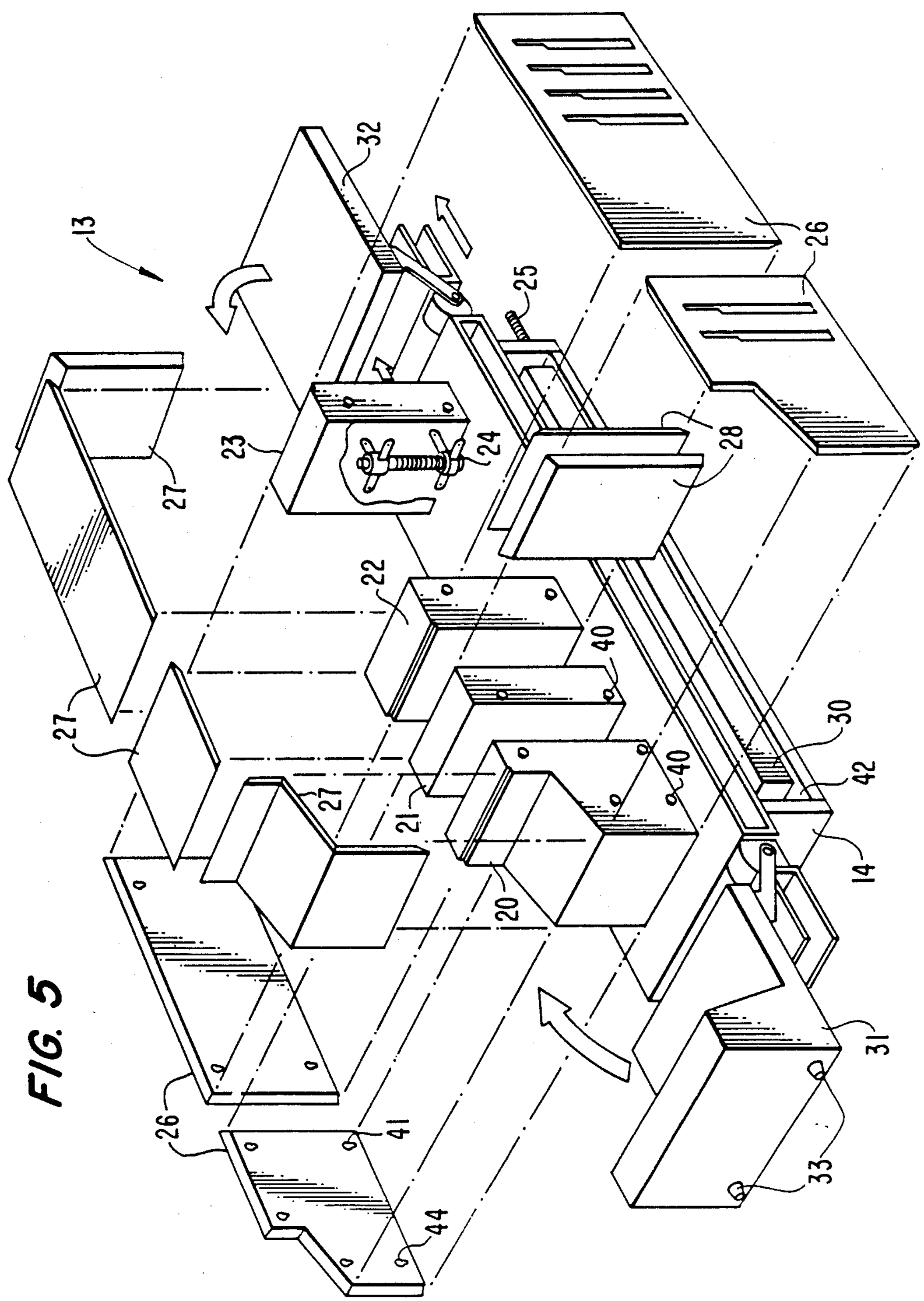
FIG. 5 is an exploded perspective view illustrating the novel positioning member according to the present invention.

More particularly, the positioning member 13 of the present invention is shown in an exploded view in FIG. 5. Thus, on support base 14 are mounted a plurality of modular members 20–23. Modular members 20, 21 are intended for the formation of freezing compartment 10, and modular members 22, 23 are intended for the formation of refrigerating compartment 11. At least modular members 21–23 are mounted on support base 14 for longitudinal movement relative thereto. In the arrangement shown in FIG. 5 it is contemplated that modular member 20 will be fixedly positioned on support base 14, but it of course is possible in accordance with the scope of the present invention to movably mount various selections of the modular members. Further, modular member 20 is shown as being shaped for the formation of a compressor recess in freezer compartment 10, as would be understood by one skilled in the art.

It is intended to be within the scope of the present invention that the movable modular members be movable with respect to support base 14 in any suitable manner. One such arrangement would be to provide a threaded bar 25 rotatably mounted on support base 14, with a plurality of coupling members 24, for example articulated levers, suitably mounted on rod 25, for example threadably mounted. Thus, rotation of bar 25, for example by means of a motor in a known manner, would cause the coupling members 24 and the respective modular members to move longitudinally of base 14. Thereby, it is possible to move the modular members to respective given positions thereof representative of different particular shapes of respective housings to be positioned thereover.

Furthermore, for each set of positions of the modular members there is provided a set of lining panels 26, 27, 28 which are mounted on the modular members 20–23. The dimensions of the lining panels of each set of lining panels varies to adapt to the shape of the particular housing involved. Thus, FIG. 5 illustrates a representative embodiment wherein side panels 26 are mounted on modular members 20–23 by means of pins 40 fitting into respective slots 41. FIG. 5 shows pins 40 on the modular members and slots 41 in the lining panels, but the arrangement could be reversed. Lining panels 28 extend transversely between respective panels 26 and particularly in the space between modular members 21 and 22, i.e. to define a space to be filled with insulation material between compartments 10, 11, as would be understood by one skilled in the art. Lining panels 27 are panels which define opposite end, top and bottom, configurations as well as outer, rearward, configurations. Lining panels 27, 28 engage lining panels 26 due to beveled edges formed on the mating edges of the respective panels.

Assembly of the positioning member 13 described above and illustrated in FIG. 5 then enables the particularly shaped housing 12 to be fitted thereover as shown in FIG. 2. It will be understood that the bottom surface of the positioning member corresponds to the openings into compartments 10, 11 to be formed. The movement of the modular members to achieve the particular positioning member shaped may be achieved automatically by a known control system, as would be understood by one skilled in the art.

When the housing 12, previously formed, is positioned on positioning member 13 (formed in the above described manner to correspond to the shape of the particular housing 12), then outer walls 15, 16, 17 are positioned about the housing 12 in a generally known manner to define between the outer walls and the housing 12 a space which is to be filled with foamed insulating material. The outer walls are positioned, for example, by means of known reciprocal locating devices and the lower edges of the outer walls are mounted o support base 14.

Figure 6:
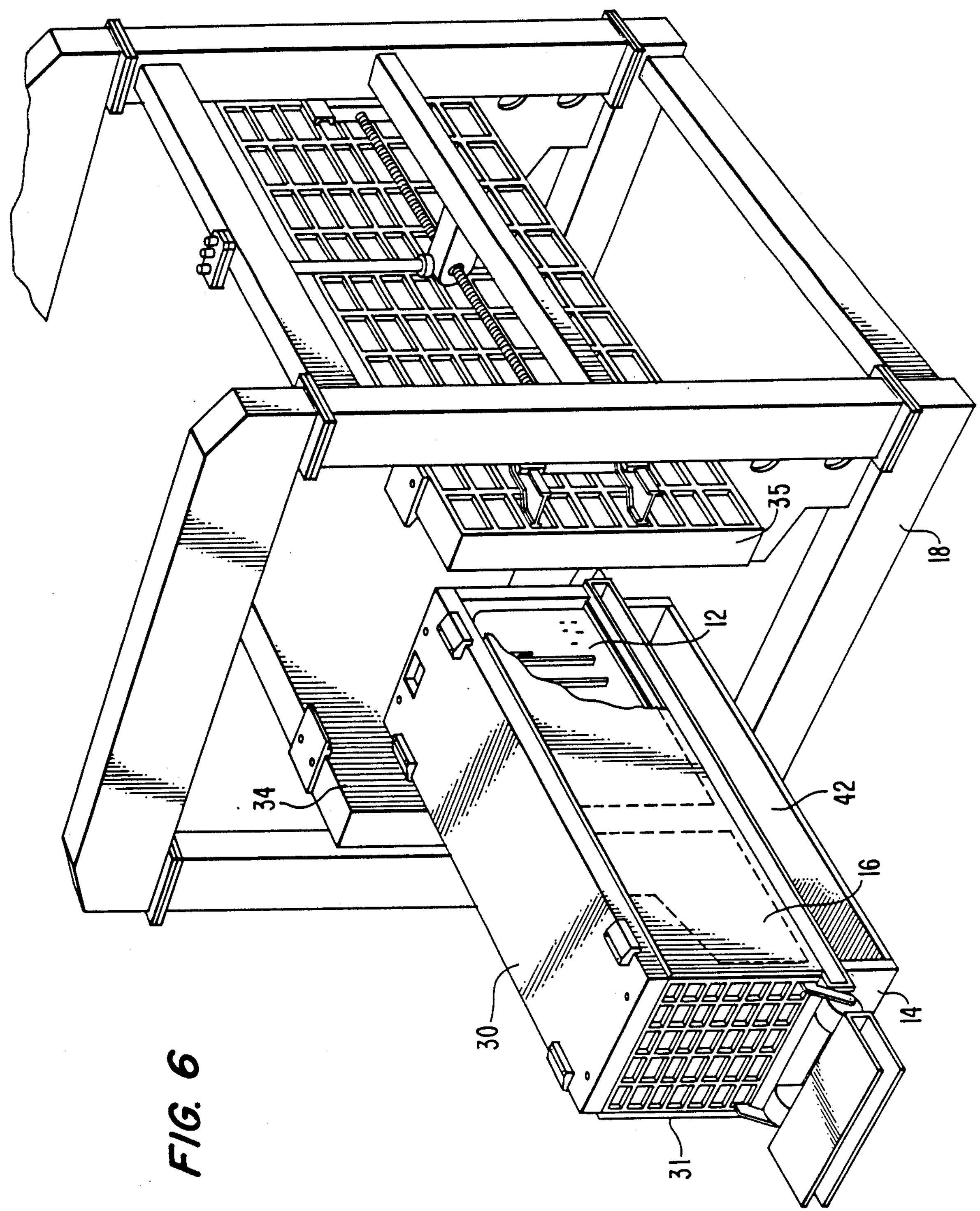
FIG. 6 is a perspective view illustrating a further feature of the present invention wherein the novel positioning member includes structural elements partially forming a foaming jig.

In accordance with a further feature of the present invention, the support base 14 is provided with structure which partially forms a foaming jig for -the later operation of foaming the insulation material into the space between the outer walls and the positioned housing. Thus, at opposite ends of support base 14 are positioned respective end plates 31, 30 which are pivoted to confront opposite ends of the respective surfaces of outer wall 17. Within support base 14 is a recess 42 for the storage of an outer cover plate 30. When end plates 31, 32 are pivoted in the direction indicated by the arrows in FIG. 5, and as shown in FIG. 6, then the cover plate 30 is mounted on end plates 31, 32 by means of, for example, pegs 33. It will be noted that as indicated by the longitudinal arrow in FIG. 5 one of the end plates 32 is mounted for longitudinal movement with respect to the support base 14. This is necessary to be able to adapt to different lengths of the cabinet to be formed. End plate 31 thus is intended to close the bottom of the formed cabinet, end plate 32 is intended to close the top of the formed cabinet, and cover plate 30 is intended to close the back of the formed cabinet. These three plates thus together form a substantial part of the necessary foaming jig.

The assembly thus formed is moved to a foaming station whereat is positioned a foaming unit 18 including the remainder of the elements forming the foaming jig. The foaming unit is substantially simplified compared to conventional arrangements, since it need only include opposite side plates 34, 35 which may be movably mounted, for example by means of automatic displacement means such as a motorized screw arrangement. Thus, when the unit of FIG. 5 is fully assembled, this fully assembled unit is moved into unit 18 as indicated in FIG. 6. Side plates 34, 35 are moved toward the assembly to thereby complete the foaming jig, after which insulation material is foamed into the space between the inner housing 12 and the outer walls, in a conventional manner.

It is to be understood that the unit shown in FIG. 5 may be moved throughout the various production installation by means of simple electrically controlled and wire guided trolleys, the conveyance paths of which readily can be altered as necessary. This makes it possible to eliminate the need for the conventional transportation systems which are of a fixed nature and which impose very limiting restrictions on a given production facility. Thus, the entire assembly operation in accordance with the present invention can be controlled by means of a suitable information processing system with a central electronic data processor connected to local operating units. The particular operations and movements of the given units may readily be changed by changing the information processing system, without the need for rebuilding or restructuring of the manufacturing facility.

Although the present invention has been described and illustrated with respect to preferred features thereof, it is to be understood that various changes and modifications may be made to the specifically described and illustrated arrangements without departing from the scope of the present invention.

We claim:

1. In a process for the manufacture of refrigerating cabinets of the type including an inner housing of thermoformed plastic, outer walls spaced from said housing and foamed insulation material filling the space between said housing and said outer walls, said process including fixedly supporting a previously formed housing of a particular shape on a positioning member including a support base and having a configuration adapted to said particular shape, positioning said outer walls about the thus supported housing to define a space therebetween, and locating the thus formed assembly in a foaming jig adapted to the shape of said formed assembly and foaming insulating material into said space, the improvement comprising employing a single said positioning member for supporting different housings of a plurality of different shapes by:

providing said single positioning member with means for adjusting the configuration thereof to adapt to said plurality of different shapes, said adjusting means including modular members movably mounted on said support base; and prior to supporting a said housing of one said shape on said positioning member, operating said adjusting means to adjust the configuration thereof to adapt to said one shape, said operating comprising selectively moving at least some of said modular members along said support base to given positions, and then fitting on the thus positioned modular members lining panels having dimensions to define the configuration of said positioning member adapted to said one shape.

2. The improvement claimed in claim 1, further comprising partially forming said foaming jig by means of plate members located on said support base.

3. The improvement claimed in claim 2, wherein said partially forming comprises moving opposite end plates pivotally mounted on said support base to positions confronting opposite ends of said formed assembly, and moving a cover plate from a position supported by said support base to a position connected to said end plates and covering the top of said formed assembly.

4. The improvement claimed in claim 3, further comprising moving said support base and the thus partially formed foaming jig to a foaming location and thereat moving side plates toward said formed assembly, thereby completing formation of said foaming jig.

5. In an apparatus for use in the manufacture of refrigerating cabinets of the type including an inner housing of thermoformed plastic, outer walls spaced from the housing and foamed insulation material filling the space between the housing and the outer walls, said apparatus including a positioning member including a support base and having a configuration adapted to a particular shape of a previously formed housing for fixedly supporting the housing, whereafter the outer walls are positioned about the thus supported housing to define a space therebetween, and the thus formed assembly is located in a foaming jig adapted to the shape of the thus formed assembly and insulating material is foamed into the space, the improvement wherein said positioning member comprises:

means for adjusting the configuration of said positioning member to adapt to a plurality of different shapes and thereby for enabling a single said positioning member to be employed for supporting different housings of said plurality of different shapes, said adjusting means comprising modular members movably mounted on said support base, means for selectively moving at least some of said modular members along said support base to given positions, lining panels having dimensions to define the configuration of said positioning member for a particular housing shape, and means for fitting said lining panels to said modular members at said given positions thereof.

6. The improvement claimed in claim 5, wherein said moving means comprises a threaded rod rotatably mounted on said support base, and coupling members threadably mounted on said rod and connected to said some modular members, such that rotation of said rod causes movement of said coupling members and said some modular members along said support base.

7. The improvement claimed in claim 5, wherein said fitting means comprise slots formed in one of said modular members or said lining panels, and pins extending from the other of said lining panels or modular members into respective said slots.

8. The improvement claimed in claim 5, further comprising means on said support base for partially forming a foaming jig about an assembly of a housing supported on said positioning member and outer walls supported on said support base about the housing.

9. The improvement claimed in claim 8, wherein said partially forming means comprises opposite end plates pivotally mounted on said support base for movement to positions confronting opposite ends of the assembly, one of said end plates further being mounted for movement longitudinally with respect to said support base.

10. The improvement claimed in claim 9, wherein said partially forming means further comprises a cover plate removably mounted in a storage position on said support plate and removable therefrom to a position connected to said end plates in said confronting positions thereof to cover the top of the assembly.

* * * * *